United States Patent
Stein et al.

(10) Patent No.: US 10,428,826 B2
(45) Date of Patent: Oct. 1, 2019

(54) METHOD AND SYSTEM TO REDUCE TO WEAR ON A BEARING

(71) Applicant: Robert Bosch GmbH, Stuttgart (DE)

(72) Inventors: Matthias Stein, Korntal-Muenchingen (DE); Thomas Steidten, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 13/688,343

(22) Filed: Nov. 29, 2012

(65) Prior Publication Data

US 2013/0142671 A1    Jun. 6, 2013

(30) Foreign Application Priority Data

Dec. 1, 2011  (DE) .......................... 10 2011 087 606

(51) Int. Cl.
*F04D 29/047* (2006.01)
*F04D 29/043* (2006.01)
(Continued)

(52) U.S. Cl.
CPC .......... *F04D 29/047* (2013.01); *F01D 25/16* (2013.01); *F01D 25/22* (2013.01); *F02C 6/12* (2013.01);
(Continued)

(58) Field of Classification Search
CPC ...... F04D 29/056; F04D 29/057; F04D 29/04; F04D 29/0413; F04D 29/047;
(Continued)

(56) References Cited

U.S. PATENT DOCUMENTS 4,060,987 A * 12/1977 Fisch ...................... B60K 3/04
                                                        415/141
4,355,850 A   10/1982 Okano
(Continued)

FOREIGN PATENT DOCUMENTS

DE        3628800 A1   3/1988
DE       10011419 A1   9/2001
(Continued)

OTHER PUBLICATIONS

JP61189317Translate, machine translation of JP61-189317; Espacenet.com; Jan. 3, 2018; pp. 1-4.*

*Primary Examiner* — Bryan M Lettman
*Assistant Examiner* — Timothy P Solak
(74) *Attorney, Agent, or Firm* — Norton Rose Fulbright US LLP; Gerard Messina

(57) ABSTRACT

A motor vehicle system device having a drive assembly, to which a charging device is assigned, has a compressor having at least one compressor runner supported using at least one bearing, the bearing having a stationary first bearing part and a second bearing part that is operatively connected to the compressor runner. An overpressure source is connected to the bearing, using which an overpressure is able to be produced in a bearing gap that is present between the first bearing part and the second bearing part. The overpressure source is the compressor and/or a part of a tandem pump, which besides the overpressure also makes available low air pressure for a user of the motor vehicle system device. The invention also relates to a method for operating a motor vehicle system device.

11 Claims, 1 Drawing Sheet

(51) Int. Cl.
  *F04D 29/041* (2006.01)
  *F04D 29/051* (2006.01)
  *F04D 29/057* (2006.01)
  *F04D 13/12* (2006.01)
  *F04D 25/16* (2006.01)
  *F04D 25/06* (2006.01)
  *F01D 25/16* (2006.01)
  *F01D 25/22* (2006.01)
  *F04D 29/056* (2006.01)
  *F02C 6/12* (2006.01)

(52) U.S. Cl.
  CPC .......... *F04D 13/12* (2013.01); *F04D 25/062* (2013.01); *F04D 25/16* (2013.01); *F04D 29/043* (2013.01); *F04D 29/0413* (2013.01); *F04D 29/056* (2013.01); *F04D 29/057* (2013.01); *F04D 29/0513* (2013.01)

(58) Field of Classification Search
  CPC ............. F04D 29/0473; F04D 29/0513; F04D 29/043; F04D 29/4206; F04D 29/046; F04D 13/12; F04D 25/062; F04D 25/16
  USPC .......... 417/278, 293, 409, 368, 411, 423.12; 384/100
  See application file for complete search history.

(56) References Cited

U.S. PATENT DOCUMENTS

| | | | | |
|---|---|---|---|---|
| 4,366,993 A * | 1/1983 | Ono | ................... | F16C 32/0662 384/120 |
| 4,690,572 A * | 9/1987 | Sasaki | ................... | F01D 25/22 137/110 |
| 4,808,070 A * | 2/1989 | Fonda-Bonardi | ....... | F01D 25/22 384/115 |
| 4,946,293 A * | 8/1990 | Helms | .............. | 384/12 |
| 5,073,036 A * | 12/1991 | Sutton et al. | ................. | 384/107 |
| 5,567,129 A * | 10/1996 | Bonardi | ................... | F01D 3/00 417/365 |
| 5,771,695 A * | 6/1998 | Halimi | ................... | F02B 37/10 60/607 |
| 5,811,201 A * | 9/1998 | Skowronski | ............ | H01M 8/04 204/269 |
| 6,079,211 A * | 6/2000 | Woollenweber et al. | ...... | 60/612 |
| 6,231,302 B1 * | 5/2001 | Bonardi | ................. | F01D 25/22 415/105 |
| 6,616,424 B2 * | 9/2003 | Raiser | ................. | B60L 11/1885 417/411 |
| 6,668,553 B1 * | 12/2003 | Ghizawi | ...................... | 60/605.3 |
| 2004/0156567 A1 * | 8/2004 | Gozdawa | ......... | F16C 32/0696 384/100 |
| 2005/0000769 A1 * | 1/2005 | Hawener | ................ | B60T 17/02 188/356 |
| 2008/0038109 A1 * | 2/2008 | Sandstede | .............. | F01D 25/22 415/111 |
| 2008/0110685 A1 * | 5/2008 | Hild | ........................ | F01D 21/00 429/492 |
| 2011/0052438 A1 * | 3/2011 | Arnold | .......................... | 418/153 |

FOREIGN PATENT DOCUMENTS

| | | | |
|---|---|---|---|
| DE | 102009038772 A1 | 3/2011 | |
| EP | 0102334 A1 | 3/1984 | |
| JP | 61-189317 * | 8/1986 | ............. F16B 32/00 |

* cited by examiner

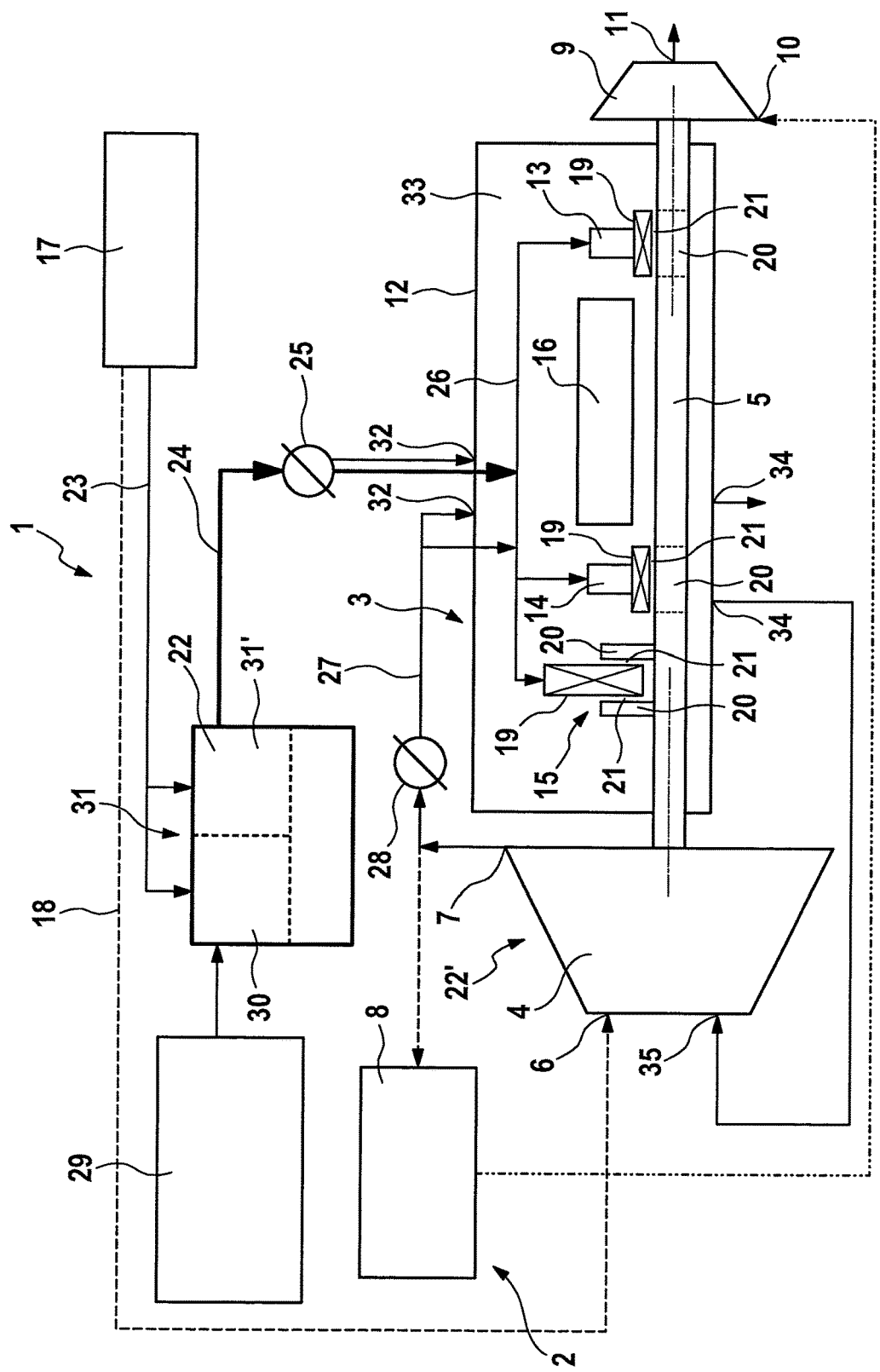

METHOD AND SYSTEM TO REDUCE TO WEAR ON A BEARING

CROSS REFERENCE TO RELATED APPLICATION

The present application claims priority to Application No. DE 10 2011 087 606.5, filed in the Federal Republic of Germany on Dec. 1, 2011, which is expressly incorporated herein in its entirety by reference thereto.

FIELD OF INVENTION

The present invention relates to a motor vehicle system device having a drive assembly to which a charging device is assigned which has a compressor having at least one compressor runner supported using at least one bearing, the bearing having a stationary first bearing part and a second bearing part that is operatively connected to the compressor runner. The present invention further relates to a method for operating a motor vehicle system device.

BACKGROUND INFORMATION

Motor vehicle system devices of the type named at the outset are known from the related art. In principle, they have any desired devices with respect to systems of the motor vehicle, particularly, the drive assembly. The charging device is supposed to be assigned to the drive assembly. It is used for the performance increase of the drive assembly, the drive assembly being able to be, for instance, an internal combustion engine or a fuel cell drive assembly having at least one fuel cell. The charging device has the compressor, which is provided for compressing fluid, particularly gas, and air, for example. The fluid compressed using the charging device is usually supplied to the drive assembly. In this way, the specific power of the drive assembly is able to be clearly increased.

To compress the fluid, the compressor has a compressor runner, which is supported using the bearing, particularly in a housing, or rather, a compressor housing. The bearing is made up of two bearing parts, namely, the first bearing part and the second bearing part. The first bearing part is usually stationary, that is, it does not rotate, while the second bearing part is assigned to the compressor runner, or rather is connected to it in a torsionally rigid manner, that is, to rotate at the same rotational speed. Thus, there is an operative connection between the second bearing part and the compressor runner. For instance, the first bearing part is present as a bearing bush and the second bearing part is present as a shaft area of a shaft, on which the compressor runner is situated in a manner resistant to torsion.

The charging device, or rather the compressor, is usually actuated as a function of an operating state of the drive assembly, the compressor runner, and correspondingly the second bearing part being able to have changing rotational speeds with respect to the first bearing part. The compressor runner may reach very high rotational speeds, in this context, particularly greater than 100,000 r.p.m. This sets very high requirements on the bearing which, for example, is developed as a sliding bearing. In motor vehicle system devices known from the related art, the bearing may be submitted to great wear.

SUMMARY

By contrast, the motor vehicle system device according to the present invention has the advantage that the wear of the bearing is able to be clearly reduced using a small effort. According to the present invention, this is achieved in that the bearing is connected to an overpressure source, using which an overpressure is able to be produced in a bearing gap present between the first bearing part and the second bearing part, the overpressure source being the compressor and/or a part of a tandem pump which, besides the overpressure, also provides a low air pressure for a user provided in the motor vehicle. In principle, the bearing, made up of a first bearing part and the second bearing part, may be designed as a fluid-dynamic, that is, a hydrodynamic or aerodynamic sliding bearing. That is, in the bearing, a so-called fluid bearing or air bearing is to be achieved, particularly at higher rotational speeds of the compressor runner, between the first and the second bearing part. In this respect, the bearing is developed as an air bearing, in which, during operation, preferably in at least a few operating regions, only fluid friction, particularly air friction takes place. In this context, the two bearing parts do not come directly into touching contact with each other. As a result, the wear of the bearing is greatly reduced compared to bearings in which solid friction occurs, or mixed friction.

In the fluid-dynamic bearing, the overpressure required to implement the bearing function is able to be applied essentially by the two bearing parts themselves, if a sufficiently high rotational speed of the compressor runner or of the shaft is present. At a rotational speed below the minimum rotational speed required for building up the overpressure, a solid friction or a mixed friction takes place in the bearing. In this instance, the two bearing parts are directly in touching contact, which results in increased wear. In order to reduce this and to increase the service life of the bearing, costly materials are frequently used. In particular, when the drive assembly is designed for a start-stop operation, a considerable effort has to be made in order to achieve a sufficient service life of the bearing. In contrast, the fluid-dynamic bearing has to be constantly supplied, using the overpressure source, with fluid under pressure, gas in particular. Correspondingly, the overpressure source has to be constantly available, for instance, in the form of an external compressor. This, however, has a negative effect on costs as well as space requirement of the motor vehicle system device and particularly the charging device.

In order to implement the supplying of the bearing with overpressure, using as little structural effort and the least possible space requirement, the compressor or a part of a tandem pump should be used as the overpressure source. It is self-explanatory that the tandem pump does not have to be present if the compressor is being used as the overpressure source. Besides the overpressure part used as the overpressure source, the tandem pump additionally has a low air pressure part, by the use of which it is also able to provide a low air pressure for the user of the motor vehicle system device and the motor vehicle. The user is accordingly a low air pressure user. By overpressure, one should understand a pressure which is greater than a reference pressure. In contrast, the low air pressure is less than the reference pressure. As the reference pressure one may draw upon the environmental pressure, for example, or the atmospheric pressure. Particular advantages with regard to space requirement come about by the use of the compressor or the tandem pump as the overpressure source for the bearing. In addition, a cost reduction may be achieved by avoiding additional components, especially of the external overpressure source.

If the bearing is a fluid-dynamic bearing, a sufficiently large overpressure may be generated in the bearing gap, using the overpressure source also below the minimum rotational speed, which enables operating the bearing only using fluid friction. Alternatively, even at a rotational speed which is greater than the rotational speed, the overpressure provided by the overpressure source is clearly able to exceed the overpressure automatically generated by the two bearing parts, so that a greater bearing capability of the bearing is given. Additional advantages are better cooling, because the bearing permanently has flowing through it fluid conveyed by the overpressure source. Accordingly, lower temperatures are present in the bearing. In this way, lower wear and thus a higher component part reliability are achieved. One may also resort to more favorable materials or do without costly coatings, which enables a cost-effective production of the bearing, or the entire motor vehicle system device. The bearing may also be reduced in size if the overpressure is large enough.

One refinement of the present invention provides that, from a flow technology point of view, a cross sectional reduction device or a cross sectional adjusting device for setting the overpressure, produced in the bearing gap, be provided between the overpressure source and the bearing. Usually, the overpressure source is able to produce an overpressure which is clearly greater than the overpressure required before the bearing gap, particularly because the bearing pressure built up by itself is still enough at higher rotational speeds. Accordingly, the cross sectional reduction device or the cross sectional adjustment device is provided. The cross sectional reduction device may be a throttle, for instance, or a restrictor that is not adjustable, that is, it has the effect of a constant cross sectional reduction in the flow connection between the overpressure source and the bearing. Using the cross sectional adjustment device, however, makes a controlled and/or regulated setting of the overpressure present in the bearing gap possible. The cross sectional adjustment device is present as a valve, for example. A simple closing/opening valve may be used in this case, for example.

One refinement of the present invention provides that the compressor runner be able to be driven by a turbine of the charging device and/or by an electrical drive device. The charging device may thus have the turbine, to which exhaust gas, particularly exhaust gas of the drive assembly, is able to be supplied. According to that, the turbine is present as an exhaust gas turbine. The turbine, or rather a turbine runner of the turbine, is operatively connected to the compressor or its compressor runner in such a way that the compressor is able to be driven using the exhaust gas flowing through the turbine. In this case, the charging device is developed as an exhaust gas turbocharger device. In this context, the drive of the compressor is implemented by the flow energy taken from the exhaust gas using the turbine. The operative connection between the turbine, or rather its turbine runner, and the compressor, or rather its compressor runner, is usually implemented using a shaft, which is accommodated, at least in regions, in a rump housing, the shaft being operatively connected both to the turbine, or rather the turbine runner and the compressor, or rather the compressor runner, particularly connected in a torsionally rigid manner.

Alternatively or in addition, the drive of the compressor may be implemented using a drive device, particularly an electric motor. In the first case, there is no turbine present and the drive device is operatively connected to the shaft for the at least occasional driving of the compressor. In the latter case, besides the compressor, the drive device is also operatively connected to the shaft, or at least able to be operatively connected. Thus the drive device supports the turbine at least from time to time in driving the compressor.

In this context, the drive device and the turbine in common provide the torque required to drive the compressor. The shaft described above is used particularly to support the compressor runner of the compressor, to which it is assigned. In addition, the supporting of the turbine runner of the turbine may also be implemented using the shaft or the drive device, especially the electric motor. This support is attained with the aid of the bearing, which is accordingly developed as a shaft bearing.

One refinement of the present invention provides that the drive assembly is a fuel cell assembly having at least one fuel cell and at least one electric machine fed with electrical energy by the fuel cell. Fuel cells frequently require an air supply device in order to supply it with an oxygenator, such as oxygen or environmental air, for the energy carrier, for example, hydrogen. In this context, the compressor is used as air supply device, and the former, as has already been described, is able to be driven by the turbine and/or the electric drive device. As the air supply device, one may use, for example, a displacement machine, such as a Roots blower or a rotary screw compressor. However, based on their good efficiency as well as their small installation space, increasingly turbo machines, that is, turbochargers having a compressor and a turbine, are used as air supply device for the fuel cell. Alternatively, the drive assembly may, of course, also be developed as an internal combustion engine, or have one.

One refinement of the present invention provides that the tandem pump be driven electrically. If the motor vehicle system device has an internal combustion engine, the low air pressure may be provided for its user, particularly at an intake manifold of the internal combustion engine. If, on the other hand, the drive assembly is a fuel cell assembly, this possibility drops out. The low air pressure must therefore be provided for the user in a different manner, for example, using an electrically driven pump. Thus, both for supplying the low air pressure to the user and also for supplying the overpressure to the bearing, a pump is required, in each case. However, installing two pumps is cost-connected for one thing, and for another, it increases the installation space required. For this reason, the tandem pump is used, using which both the overpressure and the low air pressure are able to be generated and provided. The tandem pump is provided with an electric drive, in this context.

One refinement of the present invention provides that the bearing be designed as an aerodynamic or an aerostatic sliding bearing. As was stated before, the bearing is usually developed as a sliding bearing, the sliding bearing being able to be designed either for aerodynamic (fluid-dynamic) or aerostatic (fluid-static) operation.

One refinement of the present invention provides that the bearing be an axial bearing and/or a radial bearing. A plurality of bearings may, of course, also be provided, in which case at least one axial bearing and/or at least one radial bearing is present. It may particularly be provided that there are two radial bearing and one axial bearing, the electric drive device being situated between the two radial bearings on the shaft that is operatively connected to the compressor runner. The radial bearing, on the other hand, is present between the compressor runner and the radial bearing facing the compressor runner. In this way, the shaft, or rather the compressor runner is fixed both in the radial direction and in the axial direction. If the bearing is used at the same time as axial bearing and as radial bearing, it may be designated as a combination bearing.

One refinement of the present invention provides that the user be a brake booster. According to this, the motor vehicle system device additionally has the brake booster, which is connected to the tandem pump in a flow technological manner. In this way, the tandem is able to provide to the brake booster the low air pressure (mostly pneumatic).

The present invention naturally also relates to a motor vehicle having a motor vehicle system device according to the statements above.

The present invention also relates to a method for operating a motor vehicle system device, particularly according to the above statements, the motor vehicle system device being equipped with a drive assembly to which a charging device is assigned which has a compressor having at least one compressor runner that is supported using at least one bearing, the bearing having a stationary first bearing part and a second bearing part that is operatively connected to the compressor runner. In this context, it is provided that an overpressure source be connected to the bearing, using which an overpressure is produced in a bearing gap present between the first bearing part and the second bearing part in at least one operating state of the charging device, the overpressure source being the compressor and/or a part of a tandem pump which, besides the overpressure, also provides low air pressure for a user provided in the motor vehicle. The motor vehicle system device may be further refined according to the above statements.

During operation, especially when using a fluid-dynamic sliding bearing as the bearing, it is not necessary for the overpressure source to make available permanent overpressure to the bearing. Rather, at a rotational speed of the compressor runner, or of the shaft operatively connected to it, an automatic buildup of the overpressure in the bearing gap may occur, conditioned by the relative motion between the first bearing part and the second bearing part. That is, the overpressure does not have to be made available permanently by the overpressure source. Equally well this may be provided in order, for instance, to increase the overpressure present in the bearing gap and correspondingly to improve the bearing capability of the bearing. Whether the bearing is supplied with overpressure using the overpressure source depends on the instantaneous operating state of the charging device. Thus it may be provided that, in the at least one operating state, the overpressure present in the bearing gap is produced using the overpressure source. In another operating state, however, this is not the case.

One refinement of the present invention provides that, only in an operating state in which the rotational speed of the compressor is less than a certain minimum rotational speed, the (sufficiently large) overpressure between the bearing parts be produced using the overpressure source. As was described above, the overpressure is able to build up in the bearing automatically if the rotational speed of the compressor runner is greater than or equal to the certain minimum rotational speed. This is particularly the case if the bearing is developed as a fluid-dynamic sliding bearing. As far as that goes, only in the operating state or the operating states, in which the minimum rotational speed is undershot by the rotational speed, should the (sufficiently great) overpressure between the bearing parts, or rather, in the bearing gap be produced using the overpressure source. In other operating states this is not necessary. In a bearing developed as a fluid-static bearing, on the other hand, it is usual to supply overpressure to it always using the overpressure source.

The present invention will be explained in greater detail below with reference to the exemplary embodiments shown in the drawing, without a restriction of the present invention taking place.

BRIEF DESCRIPTION OF THE DRAWING

FIGURE shows a schematic representation of a motor vehicle system device.

DETAILED DESCRIPTION

The FIGURE shows a motor vehicle system device 1 having a drive assembly 2, to which a charging device 3 is assigned. Charging device 3 has at least one compressor 4 to which a shaft 5 is assigned for supporting a compressor runner (not shown here in detail) of compressor 4. Compressor 4 is used for compressing fluid, particularly gas, for instance air, which is able to be supplied to it by a compressor inlet 6. Compressor 4 makes available the compressed fluid at a compressor outlet 7. The compressed fluid is supplied to drive assembly 2, for example. Drive assembly 2 is, for instance, a fuel cell assembly having at least one fuel cell 8 and an electric machine not shown here, which is supplied with electric current by fuel cell 8. Alternatively, instead of the fuel cell assembly, an internal combustion engine may be provided, of course.

In the exemplary embodiment shown, charging device 3 is developed as an exhaust gas turbocharger device. This means that, besides compressor 4, it has a turbine 9. Exhaust gas, particularly of drive assembly 2, is able to be supplied to turbine 9 via a turbine inlet 10. In turbine 9, the exhaust gas supplied via turbine inlet 10 flows through a turbine runner, not shown here, which is also supported using shaft 5. After that, the exhaust gas flows out of turbine 9 from a turbine outlet 11, for instance, into the exhaust gas tract, not shown here, of drive assembly 2 or motor vehicle system device 1.

Both the compressor runner and the turbine runner are connected to shaft 5 in a torsionally rigid manner. Accordingly, there is an operative connection between compressor 4 and turbine 9 via shaft 5. Consequently, compressor 4 is able to be driven using turbine 9 if the exhaust gas is supplied to it. Shaft 5 is situated in a rump housing 12, at least in sections. Rump housing 12 is usually situated between compressor 4 and turbine 9, in this instance. In this way, the heating up of the fluid supplied to compressor 4 by the heat of the exhaust gas supplied to turbine 9 is at least reduced. However, this also means that rump housing 12 is able to be acted upon by just this heat, and heated up by it.

Bearings 13, 14 and 15 are situated in rump housing 12, which are used to support shaft 5. In this respect, bearings 13 to 15 are developed as shaft bearings. Bearings 13 and 14 are used as radial bearings, that is, they are only able to take up forces in the radial direction, but not in the axial direction. Bearing 15, on the other hand, is developed as an axial bearing, and thus it prevents an axial shift of shaft 5, but it cannot take up any radial forces. It is obvious that such an exemplary embodiment of bearing 13 to 15 is purely exemplary. Of course, each bearing 13 to 15 may be designed axial, radial or axial and radial forces. In addition, rump housing 12 accommodates a drive device 16 which is designed as an electric motor, for example. Drive device 16 is operatively connected or able to be operatively connected to shaft 5. This means that the drive of compressor 4 does not have to be exclusively provided using turbine 9, but that an exclusive operation or at least a support by drive device 16 is able to be implemented. The former is provided particularly in operating points of drive assembly 2, in which no sufficiently large quantity of exhaust gas is generated to operate turbine 9.

Furthermore, motor vehicle system device 1 has a fluid inlet 17, to which compressor 4 or compressor inlet 6 is connected via an intake line 18. Advantageously, fluid intake 17 has a filter (not shown here).

Bearings 13, 14 and 15 each have a first bearing part 19 and a second bearing part 20, the first bearing part 19 being always situated in a stationary manner, and second bearing part 20 being assigned to the compressor runner of compressor 4 and connected to the latter in a torsionally rigid manner. Accordingly, a rotation of the compressor runner also effects a rotation a rotation of second bearing parts 20 of bearings 13, 14 and 15. First bearing parts 19 may, in particular, be bearing bushes of bearings 13, 14 and 15, while second bearing parts 20, at least in the case of radial bearings 13 and 14 may be formed by a region of shaft 5. In the case of axial bearing 15, second bearing part 20 may be a radial projection extending outwards from shaft 5 in the radial direction, which cooperates with first bearing part 19 for the axial fixing of shaft 5. Between bearing parts 19 and 20 there is in each case a bearing gap 21. During the operation of charging device 3, a certain overpressure of the fluid, especially air, located in this bearing gap 21 has to be present. Otherwise, the two bearing parts 19 and 20 will come into touching contact with each other, so that mixed friction or even solid friction among each other will take place. In particular, based on the additional thermal stress, this may lead to a shortening of the service lives of bearings 13 to 15.

However, if the overpressure present in bearing gap 21 is sufficiently great, there is only fluid friction between bearing parts 19 and 20. Thus, during the operation of charging device 3, these bearing parts do not come into touching contact with each other, or only rarely. Accordingly, the thermal stress is reduced, and there will be a clearly greater service life. If bearings 13 to 15 are developed as fluid-dynamic bearings, the sufficiently great overpressure will take place automatically upon the achieving or exceeding of a minimum rotational speed by the rotational speed of shaft 5. This is the case, based on the pumping effect of the two bearing parts 19 and 20. They form a wedge, particularly when loaded, into which the fluid is transported. In this context, the pressure, under which the fluid is present, is increased, so that the overpressure is produced. Naturally, one part of bearings 13 to 15 is able to be developed as a fluid-dynamic bearing and the other part as a fluid-static bearing. Also, one part of bearings 13 to 15 may be present as a roller bearing.

At a rotational speed of shaft 5 that is less than the minimum rotational speed, and even if bearings 13 to 15 are developed as fluid-static bearings, it is necessary, however, to provide, or at least increase the pressure present in bearing gap 21 by an external device. For this purpose, a (first) overpressure source 22 is connected to bearings 13 to 15, which sucks fluid from fluid intake 17 via a suction line 23, compresses it and supplies it to bearings 13 to 15 via a connecting line 24. In the connecting line, in this instance, a cross sectional reduction device 25 or, as shown here, a cross sectional adjustment device 25 may be provided. Using this, it is possible to set the overpressure present in the bearing gap 21 in a controlling and/or regulating manner, particularly to switch it on or off. In addition or alternatively, to connecting line 24, or at least to a distributor 26 provided between connecting line 24 and bearings 13 to 15 an overpressure line 27 is connected which, on its other side has a flow connection to compressor outlet 7. In overpressure line 27 there is also provided a cross sectional adjustment device 28. Compressor 4 may thus be used as a second overpressure source 22'.

The overpressure present in bearing gap 21 may thus be provided to bearings 13 to 15, using overpressure source 22 and/or using second overpressure source 22', that is, compressor 4. For example, the overpressure is made available using overpressure sources 22 and 22' in an operating state of charging device 3, in which the exhaust gas conducted through turbine 9 is not sufficient for driving compressor 4, or rather, for making available a sufficiently high overpressure at compressor outlet 7. If the overpressure present at compressor outlet 7 is sufficient, however, in the case of a further operating state, the overpressure prevailing in bearing gap 21 is able to be produced exclusively using compressor 4. In this case, overpressure source 22 and/or overpressure source 22' may be switched off or at least disconnected from the respective bearing 13 to 15 by interrupting the flow connection. At high rotational speeds, one may, under certain circumstances, do without the overpressure from compressor 4 and/or overpressure source 22.

Motor vehicle system device 1 preferably has a user 29, for whose operation low air pressure is required. Consequently, it is necessary to provide both a low air pressure source 30 for providing the low air pressure for operating user 29 and an overpressure source 22. Both overpressure source 22 and low air pressure source 30 are usually electrically operated pumps. For this reason, it is provided that both overpressure source 22 and low air pressure source 30 are part of a tandem pump 31, using which both overpressure and low air pressure are able to be made available. A low air pressure-providing part is designated as low pressure part, in this context, and an overpressure-providing part is designated as overpressure part 31'. In this context, only one electrical drive is required for tandem pump 31. That is, a plurality of separate pumps having a corresponding plurality of drives does not have to be provided. It is rather sufficient to provide tandem pump 31, which has only the one drive. Thus, using tandem pump 31 it is possible to provide both user 29 with low air pressure, from low air pressure source 30, and bearings 13 to 15 with overpressure from overpressure source 22. In accordance with this, savings in installation space and weight are achieved. Costs are also able to be lowered in this way.

In addition, it may be provided that rump housing 12 have one or more inlets 32, through which fluid is able to get into an inner space of rump housing 12. In inner space 33, bearings 13 to 15, drive device 16 and shaft 5 are situated at least in regions. At least one of inlets 32, in this context, is able to be connected to connecting line 24 or distributor 26 and at least one additional one of inlets 32 is able to be connected to overpressure line 27. First inlet 32 is thus connected, in a flow-technological manner, to overpressure source 22 and second inlet 32 is connected to compressor 4, or rather its compressor outlet 7. Accordingly, fluid under overpressure is able to be brought into inner space 33.

Rump housing 12 has furthermore at least one outlet 34, one of the outlets 34 shown here being connected in a flow-technological manner to a surroundings of motor vehicle system device 1 and the other of outlets 34 to an additional compressor inlet 35. Shown cross sectional adjustment devices are not able to be assigned to outlets 34, using which the fluid mass flow, which gets out of rump housing 12 through outlets 34 is able to be set controllably and/or regulatedly or switchably. In this way, the pressure present in inner space 33, that is, the low air pressure or the overpressure, are able to be set. Alternatively to the cross sectional adjustment elements, one may, of course, also use cross sectional reducing elements.

During operation of charging device 3, fluid is sucked in via fluid inlet 17 using compressor 4 or overpressure source 22. At least a part of the sucked up fluid is taken from rump housing 12 or its inner space 33, in this context. In this way, a fluid mass flow is created in rump housing 12, particularly starting from at least one inlet 32 up to the at least one outlet 34. This fluid mass flow is preferably directed at thermally particularly highly stressed regions of rump housing 12 or elements situated in it, for instance, bearings 13 to 15 or drive device 16. In this way, reliable cooling of these elements or regions is assured.

The fluid mass flow also takes care that moisture, particularly condensate, is sucked out of rump housing 12. Thus corrosion within rump housing 12 is additionally avoided. This applies particularly for magnets of drive device 16 which, for example, which are made up of rare earth materials and are therefore extremely sensitive. All in all, because of the measures named, namely building up the overpressure in respective bearing gap 21 and the cooling using the fluid mass flow, the service life of bearings 13 to 15 is clearly extended. At the same time, by the use of tandem pump 31, the required installation space and the costs of motor vehicle system device 1 are reduced.

What is claimed is:

1. A motor vehicle system device, comprising:
   a drive assembly for a charging device;
   a compressor having at least one compressor runner supported using at least two bearings, each of the bearings having a stationary first bearing part situated in a stationary manner and a second bearing part operatively connected to the compressor runner in a torsionally rigid manner; and
   a tandem pump including a low air pressure source and an overpressure source;
   wherein an overpressure is produced by the overpressure source and provided to the at least two bearings via a bearing gap between the first bearing part and the second bearing part of each of the bearings, wherein the compressor having an outlet in communication with the bearing gap,
   wherein the charging device includes an exhaust gas turbocharger device having the compressor and a turbine, wherein exhaust gas of the drive assembly is suppliable to the turbine via a turbine inlet, wherein the exhaust gas flows out of the turbine from a turbine outlet of the drive assembly, wherein there is an operative connection between the compressor and the turbine via a shaft so that the compressor is drive-able using the turbine, wherein the shaft is situated in a rump housing, wherein the rump housing is situated between the compressor and the turbine, so that heating up of fluid supplied to the compressor by heat of the exhaust gas supplied to the turbine is at least reduced, wherein the rump housing accommodates an electrical drive device that is operatively connected or operatively connectable to the shaft, so that the drive of the compressor is not exclusively provided via the turbine,
   wherein the at least two bearings includes an axial bearing and a radial bearing,
   wherein the axial bearing and the radial bearing are situated in the rump housing, which is used to support the shaft, the radial bearing being configured to take up forces only in a radial direction, and the axial bearing is configured to prevent the shaft from shifting in an axial direction,
   wherein the overpressure in the bearing gaps is such that there is only fluid friction between the bearing parts,
   wherein the bearings are fluid-dynamic bearings, so that overpressure takes place automatically upon achieving or exceeding a minimum rotational speed by a rotational speed of the shaft, and wherein the second bearing part is a fluid-dynamic bearing and the first bearing part is a fluid-static bearing,
   wherein if the rotational speed of the shaft is less than the minimum rotational speed, the overpressure is provided by the overpressure source,
   wherein a cross sectional reducing device or a cross sectional adjustment device is provided between the overpressure source for providing the overpressure and the axial bearing and the radial bearing for setting the overpressure produced in the bearing gap of each of the axial bearing and the radial bearing, and
   wherein the second bearing part of the axial bearing is a radial projection extending outwardly from the shaft in the radial direction, and which cooperates with the first bearing part of the axial bearing for providing axial fixing of the shaft.

2. The motor vehicle system device according to claim 1, wherein the drive assembly is a fuel cell assembly having at least one fuel cell and at least one electric machine fed with electric power by the fuel cell.

3. The motor vehicle system device according to claim 1, wherein the tandem pump is driven electrically.

4. The motor vehicle system device according to claim 1, wherein at least one of the axial bearing and the radial bearing is configured as an aerodynamic or aerostatic sliding bearing.

5. The motor vehicle system device according to claim 1, wherein the low air pressure source provides low air pressure to a brake booster.

6. The motor vehicle system device of claim 1, wherein the overpressure is produced by the overpressure source and the compressor.

7. The motor vehicle system device of claim 1, wherein the source for providing the overpressure is the tandem pump.

8. The motor vehicle system device of claim 1, wherein the source for providing the overpressure is the compressor.

9. A method for reducing wear of at least two bearings of a motor vehicle device having a drive assembly for a charging device, the method comprising:
   producing an overpressure using at least part of a tandem pump, the tandem pump including a low air pressure source and an overpressure source;
   wherein the overpressure is provided in a bearing gap between a stationary first bearing part situated in a stationary manner and a second bearing part of each of the at least two bearings, the at least two bearings being operatively connected, in a torsionally rigid manner, to a compressor runner of a compressor via the second bearing part and supporting the compressor runner, wherein the compressor having an outlet in communication with the bearing gap,
   wherein the charging device includes an exhaust gas turbocharger device having the compressor and a turbine, wherein exhaust gas of the drive assembly is suppliable to the turbine via a turbine inlet, wherein the exhaust gas flows out of the turbine from a turbine outlet of the drive assembly, wherein there is an operative connection between the compressor and the turbine via a shaft so that the compressor is drive-able using the turbine, wherein the shaft is situated in a rump housing, wherein the rump housing is situated between the compressor and the turbine, so that heating up of fluid supplied to the compressor by heat of the exhaust gas supplied to the turbine is at least reduced, wherein the rump housing accommodates an electrical drive device that is operatively connected or operatively connectable to the shaft, so that the drive of the compressor is not exclusively provided via the turbine, wherein the at least two bearings includes an axial bearing and a radial bearing, wherein the axial bearing and the radial bearing are situated in a rump housing, which is used to support the shaft, the radial bearing being configured to take up forces only in a radial direction, and the axial bearing is configured to prevent the shaft from shifting in an axial direction, wherein the overpressure in the bearing gaps is such that there is only fluid friction between the bearing parts, wherein the bearings are fluid-dynamic bearings, so that overpressure takes place automatically upon achieving or exceeding a minimum rotational speed by a rotational speed of the shaft, and wherein the second bearing part is a fluid-dynamic bearing and the first bearing part is a fluid-static bearing, wherein a cross sectional reducing device or a cross sectional adjustment device is provided between the overpressure source for providing the overpressure and the axial bearing and the radial bearing for setting the overpressure produced in the bearing gap of each of the axial bearing and the radial bearing, and wherein the second bearing part of the axial bearing is a radial projection extending outwardly from the shaft in the radial direction, and which cooperates with the first bearing part of the axial bearing for providing axial fixing of the shaft.

10. The method according to claim 9, further comprising:

prior to producing the overpressure, determining that a rotational speed of the compressor runner is less than a threshold minimum rotational speed;

wherein the overpressure between the bearing parts of each of the axial bearing and the radial bearing is produced responsive to the determination.

11. The method of claim 9, further comprising:

making available low air pressure via the low air pressure source of the tandem pump.

* * * * *